UNITED STATES PATENT OFFICE.

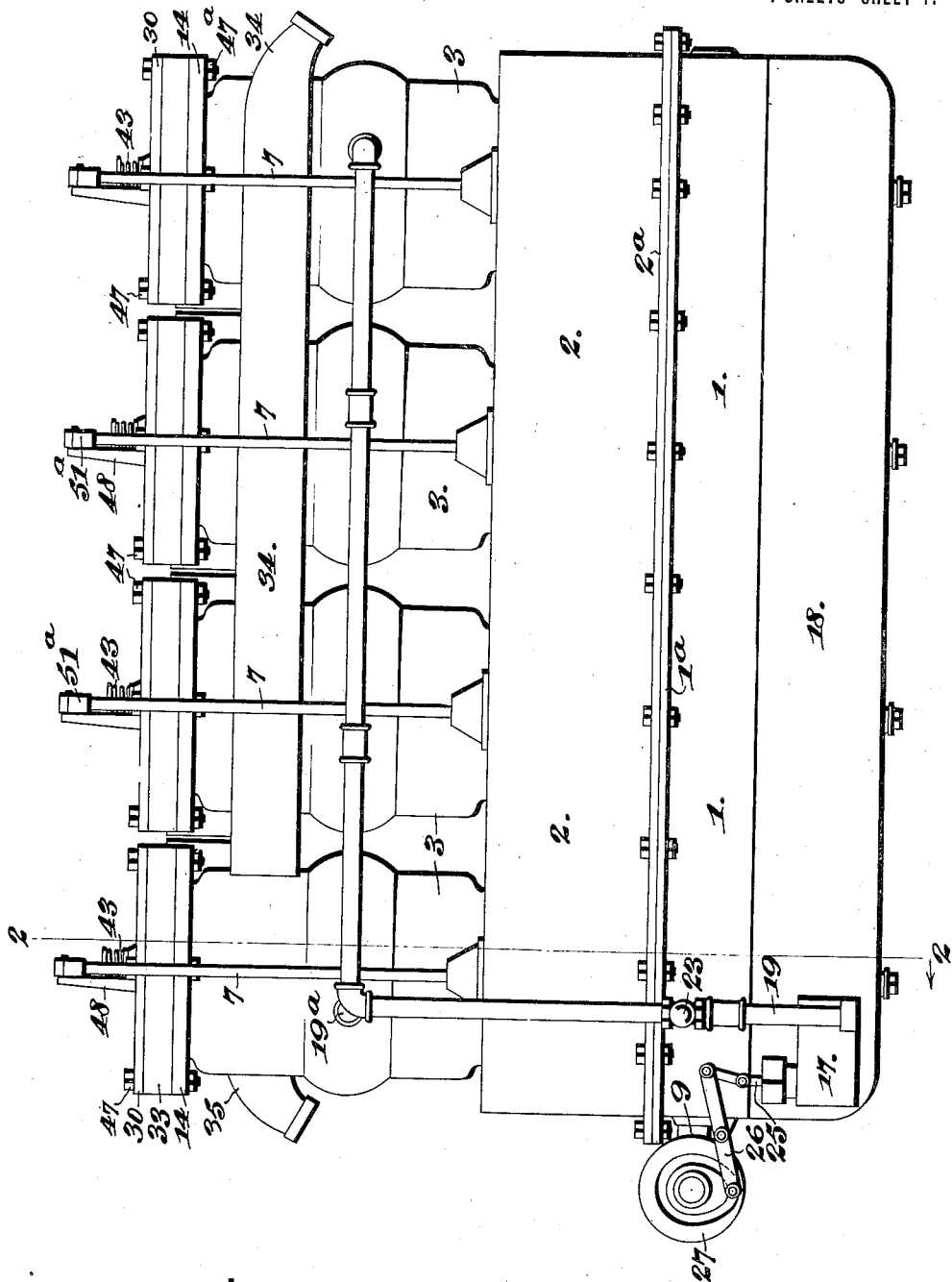

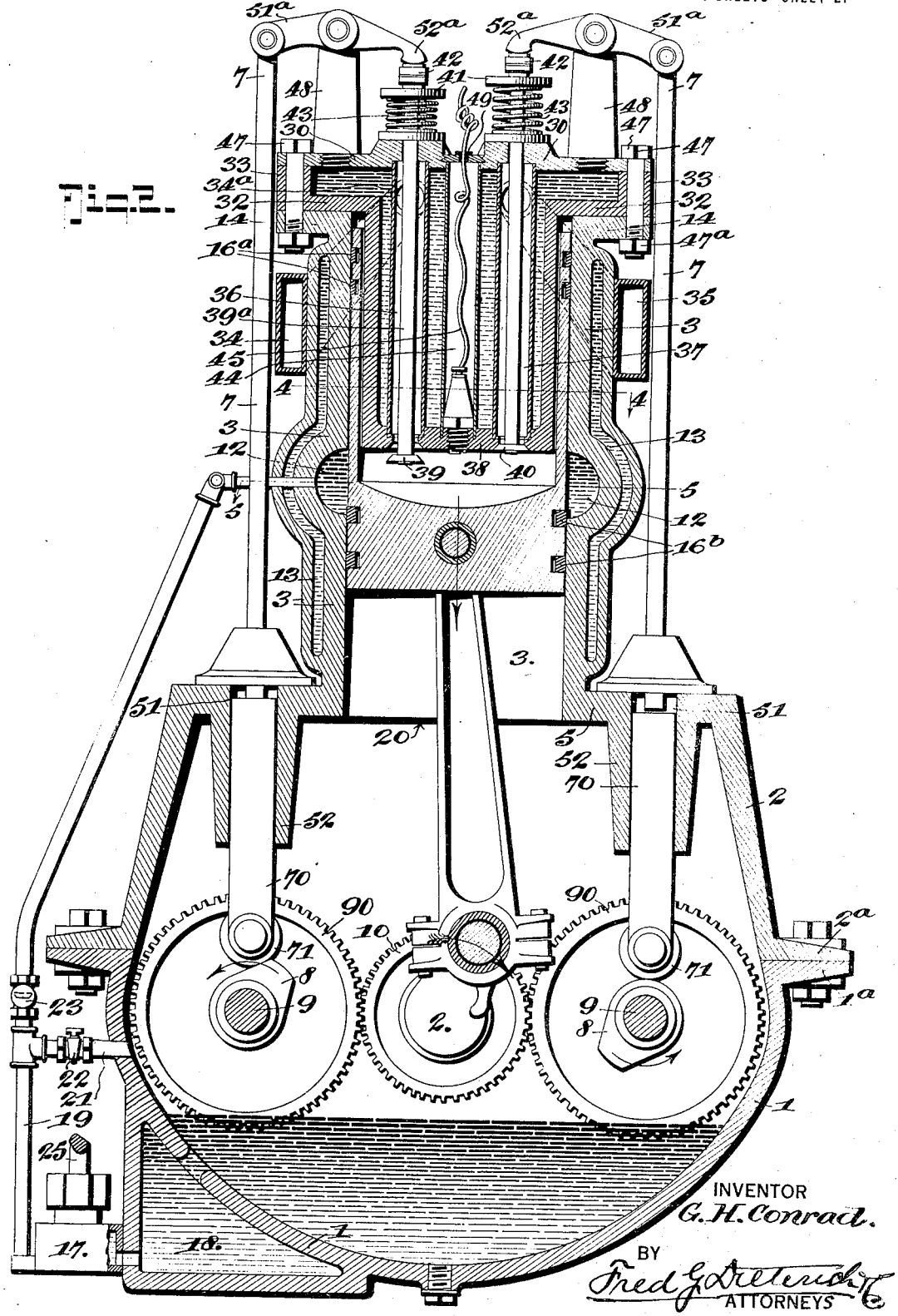

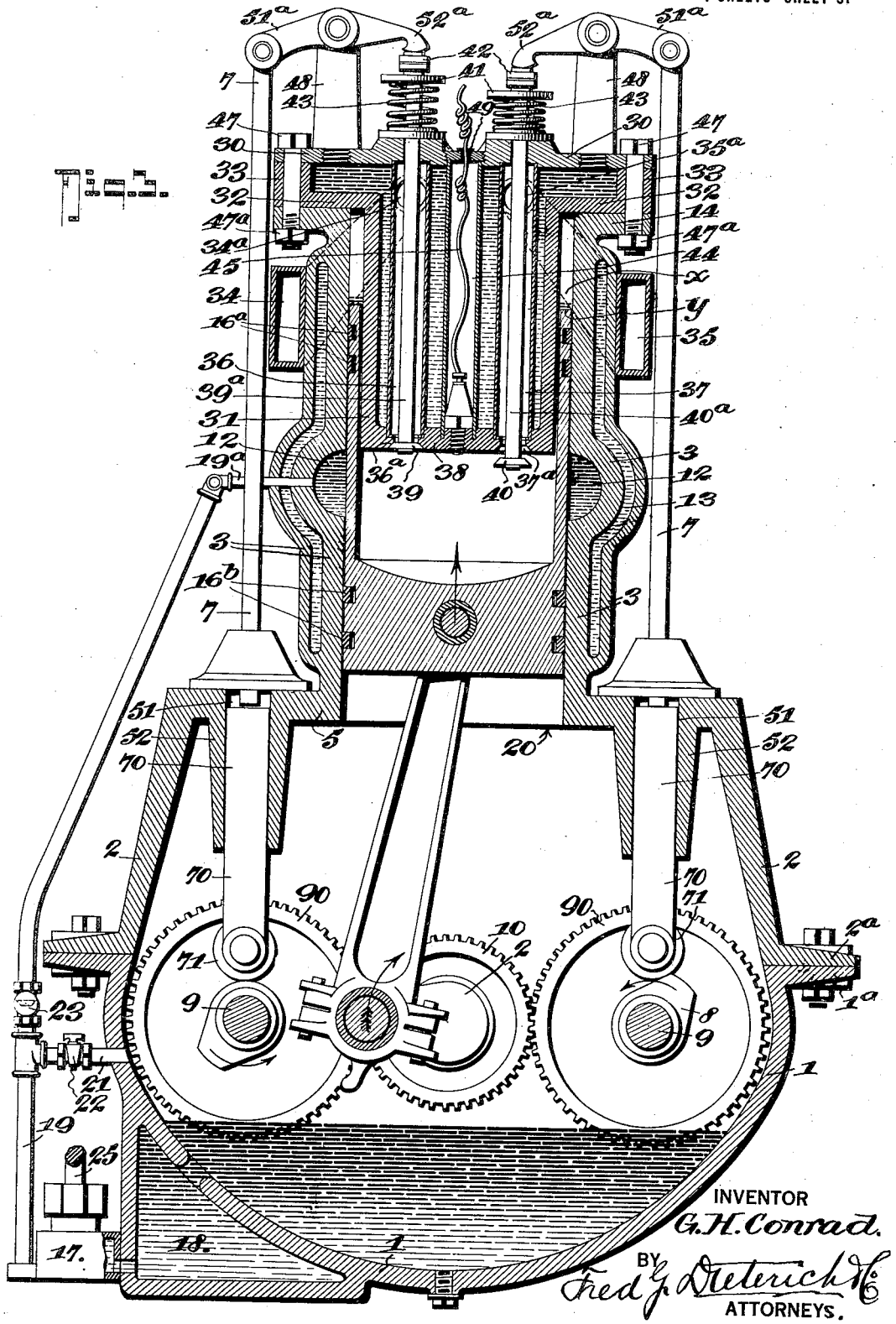

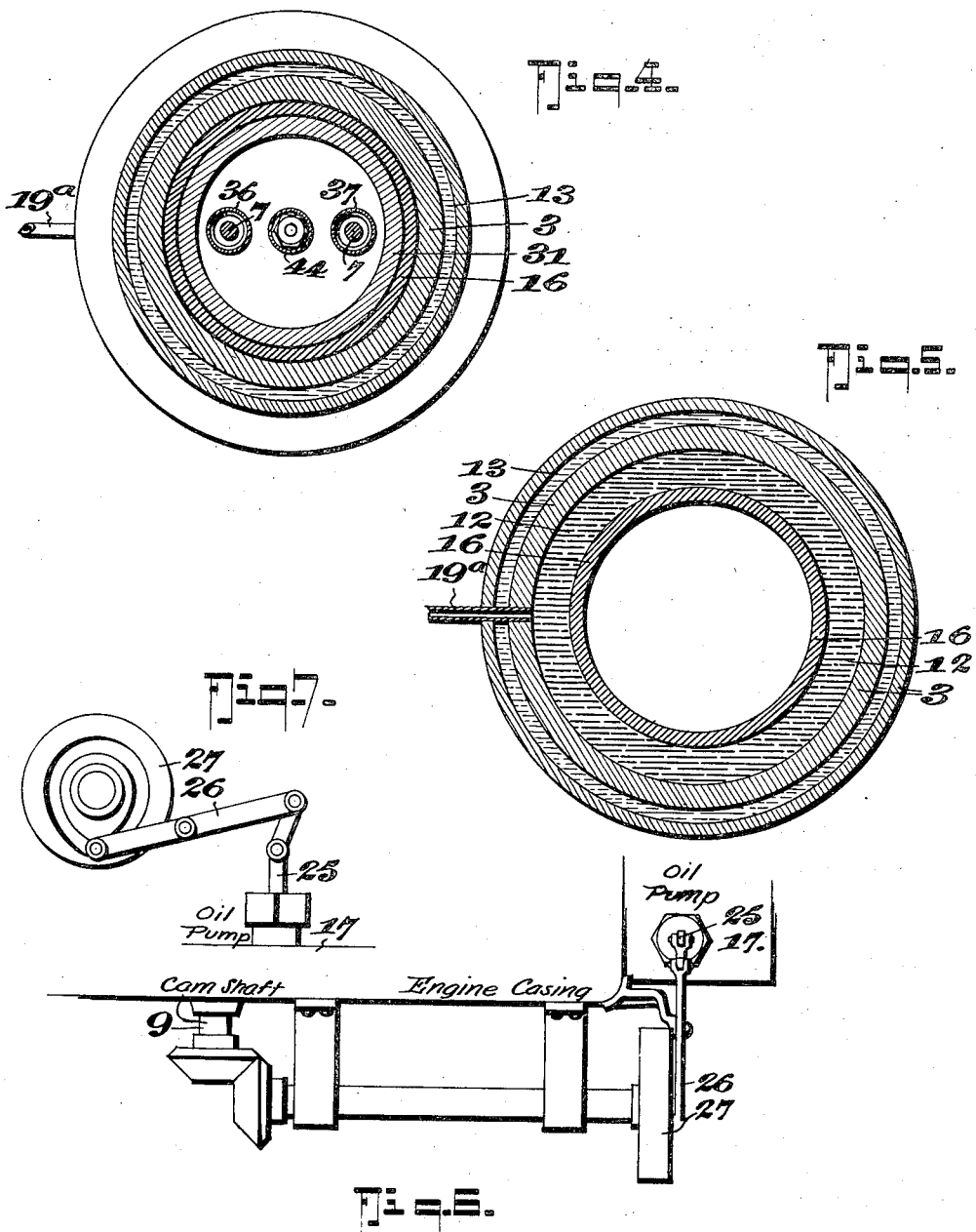

GEORGE HARFIELD CONRAD, OF HELENA, MONTANA.

LUBRICATING SYSTEM.

1,262,457.     Specification of Letters Patent.     Patented Apr. 9, 1918.

Application filed September 12, 1917. Serial No. 190,996.

*To all whom it may concern:*

Be it known that I, GEORGE HARFIELD CONRAD, residing at Helena, in the county of Lewis and Clark and State of Montana, have invented a new and Improved Lubricating System, of which the following is a specification.

This invention has reference to improvements in lubricating systems for internal combustion engines of that type in which an inverted or trunk shaped piston reciprocates within an annular space between the engine cylinder and the cylinder head which depends within the cylinder.

Primarily, my invention has for its purpose to provide an improved compact arrangement of the working cylinder and the piston, combined with improved means for positively preventing the burned gases or abrading substances passing from the explosion chamber and leaking between the working surfaces and cylinder heads and the piston.

Another object of my invention is to provide for an engine of the general character stated, a means for maintaining an annular packing, in the nature of an oil belt between the working faces of the piston and the cylinder constantly supplied from the oil well in the crank casing that serves as an effective liquid seal between the said working faces for holding back the gases that might pass over the open end of the piston and leak by the usual packing rings and, at the same time, provide a simple and effective means for lubricating the working faces of the cylinder and the piston.

Again, my invention seeks to provide an oil seal for holding back the gases that tend to pass down between the piston and the cylinder, so located, with respect to the combustion chamber and the depending cylinder head that carries the intake and exhaust valves and the ignition plug that it is not exposed to the flame during the explosion stroke.

Among other features, my invention comprehends an improved means for maintaining an oil belt or seal between the opposing working faces of the piston and the cylinder, constantly supplied during the running of the engine, and including a pipe line in communication with the crank casing oil well, and provided with a bypass capable of such automatic adjustments that the surplus oil fed to the oil belt or seal is returned to the crank casing and by which the pressure in the said belt may be regulated to provide for the proper control of the feed of the lubricant to the piston and cylinder surfaces.

My invention further embodies certain details of construction and novel combination of parts, all of which will be first described, specifically pointed out in the appended claims and illustrated in the accompanying drawings, in which:

Figure 1 is a side elevation of a four cylinder, four cycle engine embodying my invention.

Fig. 2 is a vertical transverse section of one of the cylinders, taken substantially on the line 2—2 of Fig. 1, the working piston being indicated as traveling in the pumping or intake stroke direction, the intake controlling valve being open and the exhaust controlling valve closed.

Fig. 3 is a similar view, the piston being indicated as on its up or exhausting stroke, the exhaust valve being shown as held open and the intake valve closed.

Figs. 4 and 5 are horizontal sections of one cylinder taken substantially on the lines 4—4 and 5—5 on Fig. 2.

Fig. 6 is a diagram illustrating an arrangement of the oil pumping means hereinafter referred to.

Fig. 7 is a detail side view of the crank shaft driven pump operating cam devices.

In the present showing of my invention, I have preferably illustrated a four cylinder four cycle engine but it is to be understood my improved features, particularly the oil belt seal or packing, may be readily modified to adapt them for use with other types of internal combustion engines having a greater or less number of cylinders and coöperating working pistons.

In the development of my invention as disclosed in the drawing, the engine body includes a two part casing comprising a lower or base section 1 that is suitably formed along its bottom edge for being fixedly attached to a foundation, as shown in Fig. 1, from which it will be seen that the base portion 1 has a flange 1ª for connecting with a like flange 2ª on an upper casing section 2.

The upper casing section 2 has a number of openings 20, one for each working cylinder 3, the latter being preferably cast integral with the said section 2 and in connection with each cylinder opening 20 it has a pair of diametrically oppositely disposed apertures 51—51 from which depend hubs 52 that form guides for the lower ends of a pair of vertically extended pusher rods 7—7 whose lower ends extend into the said guide hubs 52 for coöperating with vertical reciprocable tappet or plunger members 70—70, the upper ends of which ride in the hub guides 52 and the lower ends thereof carry bearing rollers 71—71 for engaging with a pair of diametrically oppositely projected cams 8—8 on a pair of oppositely disposed shafts 9—9, each having a gear 90—90 that mesh with and are driven by a driving gear 10 mounted on the crank shaft 11, it being understood that a set of shafts 9—9 with cams 8—8 and gears 10 are provided for each working cylinder and piston.

By referring more particularly to Figs. 2 and 3, which illustrate a vertical section of one complete working cylinder, piston and coöperative intake, exhaust and valve mechanisms, it will be noticed that the gear actuated cam devices referred to operate to alternately open and close the intake and exhaust manifolds, that is when the piston is making a down or pumping stroke, the pusher rod for the intake manifolds operates in the manner presently explained, to open and hold the said intake valve open during the pumping stroke, the exhaust valve during the said pumping stroke being held closed, a reverse condition of the said parts existing during the exhausting stroke of the piston when the exhaust valve is held opened and the intake valve is correspondingly held closed.

As before stated, each working cylinder 3 is preferably integral with the crown portion 5 of the upper casing sections and, in the construction shown, each cylinder is provided with an annular water jacket or space 13 and has its upper end terminating with a flat annularly extended rim 14 that constitutes a supporting ledge for the cylinder head—presently described in detail.

The working piston 16 is of the hollow or inverted trunk type and, in my construction, it has a longer top or end than the ordinary piston and, at the said upper end, it has packing rings 16ª—16ª that engage that portion of the inner wall of the cylinder 3 above an annular oil seal or belt 12, presently further explained.

16ᵇ—16ᵇ are packing rings on the lower end of the piston that engage the cylinder wall below the said oil seal or belt 12, as is clearly shown in Fig. 2.

In internal combustion engines, unless there is present a perfect packing along the contacting surfaces of the cylinder and the piston, more or less of the gas, during the compression operation, escapes between the said contacting surfaces and is lost.

Among other objections in the use of internal combustion engines, and particularly in that type of engines including a hollow piston that travels between the cylinder and a head pendent in the hollow piston, is that there is always more or less danger of excessive lubrication and the lubricant mixing with the exploded charge and carbonizing within the hollow piston and depositing on the spark plug valves, etc., making frequent adjustments of the piston packing elements, cleaning the piston, and the valves and spark plug necessary.

An essential feature of my present invention lies in the provision for internal combustion engines of an improved means for maintaining a practically positive seal between the combustion chamber and the crank casing and for providing a proper feed of the lubricant to the moving parts in such manner that the said combined seal and lubricating means is not unduly exposed to the flame during the expansion of the exploded charge.

In the present showing of my invention, the means for constantly maintaining the aforesaid seal between the combustion chamber and the crank casing is in the nature of a belt or ring of oil between the working faces of the piston and the cylinder that primarily operates to prevent leakage of any of the gases that may seep past the packing rings between it and the combustion chamber and which, combined with devices controlled by the moving piston, regulates the feed of the lubricant to the said belt or ring seal and operates for automatically returning any surplus oil that may pass to the said belt or ring to the source of supply and at the same time provide for keeping the oil fed to the said working faces exactly right.

By referring more particularly to Figs. 2 and 3, it will be noticed the belt-like seal 12 is formed by providing an annular concaved cavity or ring pocket on the working face of the cylinder 3 and at a point sufficiently below the lowermost position of the top of the piston that the upper piston packing rings remain above the said seal to thereby produce a relatively long trail for the burning gases that may tend to pass up between the piston and the cylinder head faces and over the top of the piston and between the piston and the working cylinder faces, it being understood that since some of the lubricant in the chamber space x, in which the piston travels, collects upon the upper edge y of the piston, an additional seal is provided at such point for holding the gases back from leaking past the upper packing rings, thereby making it practically impossible for the flame to reach the belt seal 12.

During the operation of the engine, the belt 12 remains constantly filled with lubricant and under such pressure that a uniform oil filling is kept between the upper end of the piston and the cylinder, it being understood that any excessive oil fed to the part of the piston and the cylinder drains back into the crank casing.

To provide for supplying oil to the seal 12 and cause it to distribute in the manner explained, I employ a pump 17 in communication with a well 18 that forms a part of the crank casing.

The pump 17 includes a pipe 19 that has a lateral 19$^a$ which projects through the cylinder and connects with the seal belt 12, as shown.

A bypass 21, provided with a controlling valve 22, connects with the pipe 19 at a point below a back check valve 23 in the said pipe and the said bypass 21 leads back into the crank casing, it being understood that the several cylinders of the engine are simultaneously fed from the one feed pipe through proper lateral connections, as is generally indicated in Fig. 1.

By providing the valve bypass and the check valve devices, as stated, the valve 23 may be set to regulate the pressure of the oil to be held in the seal belt 12, it being also understood that when the pressure in the belt 12 gets above normal, the excessive feed will pass by the valve 23 back into the crank casing.

Any suitable engine driven connections for operating the pump may be employed. In the drawings, I have shown the pump piston 25 link-connected with a rocking lever 26 actuated by a cam disk 27 on one of the cam shafts, see Figs. 6 and 7.

As before stated, the cylinder head in the engine construction shown is of that type which is pendent within the working cylinder and the hollow piston. As clearly shown in Figs. 2 and 3, the cylinder head includes a closure or top plate 30 and a head portion proper consisting of a hollow cylindrical body 31 of a diameter for being snugly engaged by the open top hollow piston, and which has an integral annular horizontal flange 32 for resting upon the ledge 14 of the cylinder 3, and the said flange 32 has an integral annular rim 33 upon which the top plate 30 is mounted.

34—35 respectively designate an intake manifold common to all of the intake ports 34$^a$ and an exhaust manifold common to all of the exhaust ports 35$^a$, and each set of intake and exhaust ports 34—35$^a$ open into tubes 36—37 between the top closure plate 30 and the lower end 38 of the cylinder head, the latter having ports 36$^a$—37$^a$ formed with seats for the intake and exhaust controlling valves 39 and 40 that open into the combustion chamber.

The valves 39—40 are each secured upon a valve rod 39$^a$—40$^a$ that extend up through their respective tubes 36—37 and through apertures in the top 30 and at their upper projected ends 39$^a$—40$^a$ each of the rods carries a disk 41—41 and a nut-like head 42—42. 43—43 designate springs mounted on the valve rods between the top plate 30 and the disks 41—41, the tension of which tends to normally hold the intake and exhaust controlling valves to their closed position.

A third tube 44 is located between the top plate 30 and the bottom of the cylinder head and the same forms a protecting jacket for the wire lead 45 to the spark plug 46 mounted on the bottom end of the cylinder head. The wire lead 45 extends through an insulated plug 47 in the top 30, as shown.

By constructing the cylinder head as stated and shown, the said hollow body serves as a fluid reservoir, the upper part of which is closed by the annular rim 33, it being understood that the water in the cylinder head is kept sufficiently hot by heat expansion from the exhaust tube 35 to keep the intake tube 34 sufficiently hot to primarily expand the working agent as it passes from the intake port to the combustion chamber.

It will be noticed by reference to Fig. 3, the cylinder heads consist of two parts, the cover 30 and the hollow body, and the several tubes for the intake and exhaust and the spark plug are securely held in place by forming the bottom portion of the cylinder head with seats in which the lower ends of the tubes project and corresponding seats in the under face of the cover that receive the upper ends of the said tubes.

The cover or top plat is secured to the top of the cylinder by lag bolts 47—47 that pass through the top or cover, the rim 33 of the cylinder head and the annular flange or ledge 14 of the cylinder.

48—48 designate upright brackets secured to the cover plates 30 and to each of which is connected an oscillatable lever 51$^a$—51$^a$, and said levers each have one end pivotally joined with the upper end of their respective lifting rods 7—7 and their other ends formed with a heel 52$^a$ for engaging the tappets or nut ends 42 of their respective intake and exhaust valve rods.

By forming the cylinder head as shown and described, the several parts that constitute the said head can be quickly assembled for use and held to their operative position by applying the bolts 47—47, it being readily apparent from the drawing that the said head may be easily bodily lifted out of the said cylinder by disconnecting the levers 51—51 from their respective rods 7—7 and by moving the nuts 47$^a$—47$^a$ from the bolts 47—47 and when removed from the cylinder by disconnecting the tappets or nuts 42 from the upper ends of the rods, the several parts, the top 30, the valve rods, the spark plug and the tubes or sleeves may be easily separated for cleaning, etc.

While I have shown and described the lubricant seal feature of my invention as especially well adapted for use in engines having the cylinder head pendent within a hollow piston, its use is not restricted to such particular type of engines, since it may, under slight modifications, as to form and location, be embodied in the ordinary types of internal reciprocable piston combustion engines.

From the foregoing description, taken in connection with the accompanying drawings, it is thought the complete construction, manner of operation and the advantages of my invention will be readily understood by those skilled in the art to which it relates.

What I claim is:

1. In an internal combustion engine, the combination with the cylinder and piston; of an annular oil chamber between the working faces of the cylinder and piston, and means for maintaining a supply of oil in the said chamber.

2. In an internal combustion engine, the combination with the cylinder and piston; of an annular oil chamber between the working faces of the cylinder and piston, an oil reservoir and a pump mechanism for forcing the oil from the reservoir to the oil chamber.

3. In an internal combustion engine, the combination with the cylinder and piston; of an annular oil belt between the working faces of the cylinder and piston, an oil reservoir, a pump mechanism for forcing the oil from the reservoir to the oil belt, the said pump mechanism including means for relieving back pressure on the pump when the chamber is filled.

4. In an internal combustion engine, the combination with the crank casing, the cylinder and piston; of an annular oil belt between the working faces of the cylinder and piston, an oil reservoir in communication with the crank casing, a pump mechanism for forcing the oil from the reservoir to the oil belt, the said pump mechanism including means for relieving back pressure on the pump when the chamber is filled, the said means including a bypass to the crank casing.

5. In an internal combustion engine, the combination with the working cylinder and the piston and the crank casing oil well; of an annular oil belt between the working faces of the cylinder and piston, and means operated from the engine shaft for constantly supplying oil to the said belt from the crank casing oil well and packing elements that engage the said working faces of the piston and cylinder at a point between the combustion chamber of the engine and the annular oil belt.

6. In an internal combustion engine, the combination with the piston, the cylinder and the crank casing; of a packing between the working faces of the cylinder and the piston for preventing the flame passing between the said piston and cylinder, the said packing consisting of an annular belt in the cylinder wall, and engine operated means for maintaining a supply of oil in the said pocket.

7. In an explosive engine, the combination with the cylinder and the piston; of a packing consisting of an annular oil belt between the working faces of the piston and the cylinder, and means for keeping the said belt full of oil, the said means consisting of devices for deflecting excess feed of oil from the said oil belt.

GEORGE HARFIELD CONRAD.

Copies of this patent may be obtained for five cents each, by addressing the "Commissioner of Patents, Washington, D. C."